US007847022B2

(12) United States Patent
Wright et al.

(10) Patent No.: US 7,847,022 B2
(45) Date of Patent: *Dec. 7, 2010

(54) ARTICLES PREPARED FROM CONTROLLED DISTRIBUTION BLOCK COPOLYMERS

(75) Inventors: Kathryn Wright, Katy, TX (US); Dale Lee Handlin, Jr., Houston, TX (US); Carl Lesley Willis, Houston, TX (US); Margaret Ann Burns Clawson, Houston, TX (US); Hendrik de Groot, Louvain-La Neuve (BE); Huan Yang, Houston, TX (US); Keith E. Eiden, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/359,953

(22) Filed: Feb. 6, 2003

(65) Prior Publication Data
US 2003/0166776 A1  Sep. 4, 2003

Related U.S. Application Data

(63) Continuation-in-part of application No. 10/209,285, filed on Jul. 31, 2002, now abandoned.

(60) Provisional application No. 60/355,210, filed on Feb. 7, 2002.

(51) Int. Cl.
*C08L 53/02* (2006.01)
*C08F 297/04* (2006.01)

(52) U.S. Cl. .......................... 525/88; 525/98; 525/271; 525/93; 525/99

(58) Field of Classification Search ................. 525/271, 525/88, 98, 93, 99
See application file for complete search history.

(56) References Cited

U.S. PATENT DOCUMENTS

| 2,975,160 A | 3/1961 | Zelinski |
| 3,149,182 A | 9/1964 | Porter |
| RE27,145 E | 6/1971 | Jones |
| 3,595,942 A | 7/1971 | Wald et al. |
| 3,600,250 A | 8/1971 | Evans |
| 3,634,549 A | 1/1972 | Shaw et al. |
| 3,670,054 A | 6/1972 | De La Mare et al. |
| 3,700,633 A | 10/1972 | Wald et al. |
| 3,821,148 A | 6/1974 | Makowski et al. |
| 3,985,830 A | 10/1976 | Fetters |
| 4,073,831 A | 2/1978 | Tabana et al. |
| 4,089,913 A | 5/1978 | Miki et al. |
| 4,107,131 A | 8/1978 | Gergen et al. |
| 4,122,134 A | 10/1978 | Miki et al. |
| 4,248,981 A * | 2/1981 | Milkovich et al. ........... 525/271 |
| 4,267,284 A | 5/1981 | Kitchen |
| 4,367,325 A | 1/1983 | Takeuchi et al. |
| 4,412,087 A | 10/1983 | Trepka |
| 4,547,560 A | 10/1985 | Hattori et al. |
| 4,578,429 A | 3/1986 | Gergen et al. |
| 4,603,155 A | 7/1986 | Muramori et al. |
| 4,835,200 A | 5/1989 | St. Clair |
| 4,882,384 A | 11/1989 | Willis |
| 4,898,914 A | 2/1990 | Gergen et al. |
| 4,970,265 A | 11/1990 | Willis |
| 5,075,377 A | 12/1991 | Kawabuchi et al. |
| 5,191,024 A | 3/1993 | Shibata et al. |
| 5,206,300 A | 4/1993 | Chamberlain |
| 5,276,101 A | 1/1994 | Chamberlain et al. |
| 5,290,875 A | 3/1994 | Moczygemba et al. |
| 5,306,779 A | 4/1994 | Shibata et al. |
| 5,346,964 A | 9/1994 | Shibata et al. |
| 5,506,299 A | 4/1996 | Gelles et al. |
| 5,516,831 A | 5/1996 | Pottick et al. |
| 5,545,690 A | 8/1996 | Trepka et al. |
| 5,603,155 A | 2/1997 | Satomi et al. |
| 5,910,546 A | 6/1999 | Trepka et al. |
| H1808 H * | 10/1999 | Djiauw et al. ................ 524/505 |
| 5,972,519 A * | 10/1999 | Niessner et al. ........... 428/474.4 |
| 5,977,519 A | 11/1999 | Sorensen et al. |

(Continued)

FOREIGN PATENT DOCUMENTS

| EP | 0 492 490 B1 | 8/1996 |
| EP | 808342 | 11/1997 |
| EP | 0822227 A1 | 2/1998 |
| EP | 0845498 A1 | 6/1998 |
| EP | 0 877 038 A2 | 11/1998 |
| EP | 0 654 488 B1 | 1/1999 |
| EP | 0 398 758 B1 | 3/1999 |
| EP | 0 859 803 B1 | 12/1999 |
| EP | 0 927 210 B1 | 6/2000 |
| EP | 0 766 706 B1 | 12/2001 |

(Continued)

OTHER PUBLICATIONS

Yih-Chau Lin; Raymond Chien-Chao Tsiang, "Using Heavy Ethers as Structure Modifiers in the Synthesis of SBS Block Copolymers in Cyclohexane", J. Appl. Polym. Sci. 64(13) 2543-2560 1997, John Wiley & Sons, Inc.

(Continued)

*Primary Examiner*—Jeffrey C Mullis
(74) *Attorney, Agent, or Firm*—Novak, Druce & Quigg LLP

(57) ABSTRACT

The present invention relates to articles prepared from novel anionic block copolymers of mono alkenyl arenes and conjugated dienes, and to blends of such block copolymers with other polymers. The block copolymers have mono alkenyl arene end blocks and controlled distribution blocks of mono alkenyl arenes and conjugated dienes. The block copolymer may be blended with at least one other polymer selected from the group consisting of olefin polymers, styrene polymers, amorphous resins and engineering thermoplastic resins.

33 Claims, No Drawings

U.S. PATENT DOCUMENTS

| | | | |
|---|---|---|---|
| 6,031,053 | A | 2/2000 | Knoll et al. |
| 6,107,411 | A | 8/2000 | Toya et al. |
| 6,197,889 | B1 * | 3/2001 | Knoll et al. ............... 525/314 |
| 6,235,847 | B1 * | 5/2001 | Hoshi et al. ............... 525/314 |
| 6,265,484 | B1 | 7/2001 | Trepka et al. |
| 6,265,485 | B1 | 7/2001 | Trepka et al. |
| 6,346,572 | B1 | 2/2002 | Loth et al. |
| 6,492,469 | B2 | 12/2002 | Willis |
| 6,521,712 | B1 * | 2/2003 | Knoll et al. ............... 525/314 |
| 6,759,454 | B2 | 7/2004 | Stephens et al. |
| 7,141,621 | B2 | 11/2006 | St. Clair et al. |
| 7,169,848 | B2 | 1/2007 | Bening et al. |
| 7,223,816 | B2 | 5/2007 | Handlin, Jr. et al. |
| 7,267,855 | B2 * | 9/2007 | Handlin et al. ............ 428/34.1 |
| 2003/0149140 | A1 * | 8/2003 | Stephens et al. ............ 524/59 |
| 2003/0176574 | A1 * | 9/2003 | St. Clair et al. ............ 525/88 |
| 2003/0181584 | A1 * | 9/2003 | Handlin et al. ............. 525/88 |
| 2003/0181585 | A1 * | 9/2003 | Handlin et al. ............. 525/88 |
| 2004/0072951 | A1 | 4/2004 | Hansen et al. |
| 2004/0138371 | A1 | 7/2004 | St. Clair et al. |
| 2005/0171290 | A1 * | 8/2005 | Bening et al. ............... 525/314 |
| 2006/0205849 | A1 | 9/2006 | St. Clair |
| 2006/0205904 | A1 | 9/2006 | St. Clair |

FOREIGN PATENT DOCUMENTS

| | | |
|---|---|---|
| GB | 2 138 009 A | 10/1984 |
| JP | 60-163910 | 8/1985 |
| JP | 61-291610 | 12/1986 |
| JP | 6-271717 | 9/1994 |
| JP | 7-149952 | 6/1995 |
| WO | 9503447 A1 | 2/1995 |
| WO | 9701601 | 6/1996 |
| WO | 9624634 | 8/1996 |
| WO | 00/58380 | 10/2000 |

OTHER PUBLICATIONS

Abstract of CN1149061, Wang Dechong, May 7, 1997.
Abstract of TW288022, Jong-ShinnTW Chen; Oct. 11, 1996.

* cited by examiner

ARTICLES PREPARED FROM CONTROLLED DISTRIBUTION BLOCK COPOLYMERS

CROSS-REFERENCE TO RELATED APPLICATIONS

The present application claims the benefit of U.S. Provisional Patent Application Ser. No. 60/355.210, filed Feb. 7, 2002, entitled Novel Block Copolymers and Method for Making Same, and is a continuation-in-part of U.S. patent application Ser. No. 10/209,285, filed Jul. 31, 2002, entitled Elastomeric Articles Prepared from Controlled Distribution Block Copolymers, now abandoned.

The present application is related to copending, commonly assigned U.S. patent application Ser. No. 10/359,981 entitled Novel Block Copolymers and Method for Making Same, now published as US2003/0176582 A1, commonly assigned U.S. patent application Ser. No. 10/359,906 entitled Polymer Modified Bitumen Compositions, now U.S. Pat. No. 6,759,454, commonly assigned U.S. patent application Ser. No. 10/359,927 entitled Adhesives and Sealants From Controlled Distribution Block Copolymers, now published as US2003/0176574 A1, commonly assigned U.S. patent application Ser. No. 10/359,907 entitled Articles Prepared From Hydrogenated Controlled Distribution Block Copolymers, now published as US2003/0181585 A1, commonly assigned U.S. patent application Ser. No. 10/359,462 entitled Gels From Controlled Distribution Block Copolymers, now published as US2003/0153681 A1, all of which were filed Feb. 6, 2003 and commonly assigned International Patent Application Serial Number PCT/NL03/00098 filed on Feb. 7, 2003 entitled Solvent-Free, Hot Melt Adhesive Composition Comprising a Controlled Distribution Block Copolymer, now published as WO 03/066769 A1, and commonly assigned U.S. patent application Ser. No. 10/745,352 filed Dec. 12, 2003, entitled Gels from Controlled Distribution Block Copolymers, now published as US2004/0138371 A1, which is a continuation-in-part of U.S. patent application Ser. No. 10/359,462, and commonly assigned U.S. patent application Ser. No. 10/681,608 filed Oct. 8, 2003 entitled Photopolymerizable Compositions and Flexographic Printing Plates Prepared from Controlled Distribution Block Copolymers, now published as US2004/0072951, all of which claim the benefit of U.S. Provisional Patent Application Ser. No. 60/355,210 filed Feb. 7, 2002.

BACKGROUND OF THE INVENTION

1. Field of the Invention

This invention relates to articles prepared from novel anionic block copolymers of mono alkenyl arenes and conjugated dienes, and to blends of such block copolymers with other polymers. The invention also relates to formed articles and methods for forming articles from such novel block copolymers.

2. Background of the Art

The preparation of block copolymers of mono alkenyl arenes and conjugated dienes is well known. One of the first patents on linear ABA block copolymers made with styrene and butadiene is U.S. Pat. No. 3,149,182. Over the last forty plus years a large number of new styrene diene polymers have been developed. Now a novel anionic block copolymer based on mono alkenyl arene end blocks and controlled distribution mid blocks of mono alkenyl arenes and conjugated dienes has been discovered and is described in copending, commonly assigned U.S. patent application Ser. No. 60/355,210, entitled "NOVEL BLOCK COPOLYMERS AND METHOD FOR MAKING SAME", and its continuing applications. Methods for making such polymers are described in detail in the above-mentioned patent application.

What has now been found is that blends or compounds of these novel block copolymers with processing oils and other polymers have surprising property advantages, and show promising utility in a variety of end-use applications, including injection molding, extruded goods and polymer modification.

SUMMARY OF THE INVENTION

In one aspect of the present invention we have discovered that a novel composition comprising at least one unhydrogenated block copolymer having a controlled distribution block of a mono alkenyl arene and conjugated diene, and optionally including another component, has superior properties for many applications. We have also discovered that these compositions can be used in various forming processes, and that they also have a number of advantages in processing.

Accordingly, the broad aspect of the present invention is an article comprising at least one unhydrogenated block copolymer and, optionally, at least one other component selected from the group consisting of olefin polymers, styrene polymers, tackifying resins, polymer extending oils and engineering thermoplastic resins, wherein said block copolymer has at least one A block and at least one B block, and wherein (a.) each A block is a mono alkenyl arene homopolymer block and each B block is a controlled distribution copolymer block of at least one conjugated diene and at least one mono alkenyl arene; (b.) each A block having an average molecular weight between about 3,000 and about 60,000 and each B block having an average molecular weight between about 30,000 and about 300,000; (c.) each B block comprises terminal regions adjacent to the A blocks that are rich in conjugated diene units and one or more regions not adjacent to the A blocks that are rich in mono alkenyl arene units; (d.) the total amount of mono alkenyl arene in the block copolymer is about 20 percent weight to about 80 percent weight; and (e.) the weight percent of mono alkenyl arene in the B block is between about 10 percent and about 75 percent.

In another aspect of the present invention we have shown that the article can be formed in a wide variety of processes, including injection molding, compression molding, over molding, dipping, extrusion, roto molding, slush molding, fiber spinning, blow molding, polymer modification, cast film making, blown film making and foaming.

In yet another aspect of the present invention, the article can be processed into the form of a film, sheet, multi layer laminate, coating, band, strip, profile, molding, foam, tape, fabric, thread, filament, ribbon, fiber, plurality of fibers, or fibrous web.

As for advantages of the present invention, it has long been desired to have a polymer with high polystyrene content that is still elastomeric. The invention described herein consists of styrenic block copolymers with polystyrene contents ranging from 35%-80% with elastomeric properties. Elastomeric performance is indicated by the absence of a distinct yield point as well as recovery upon release of an applied load. One feature of such a polymer is a high rubber modulus in conjunction with a relatively low Young's modulus. For example, a polymer can be produced with a very stiff rubber response that is still relatively soft. This is unique in comparison with the prior art polymers because the controlled distribution gives the polymers of the present invention improved elasticity, softness, and clarity. Another feature of such a polymer is that it has a tendency not to degrade conjoined adhesives. This is due to a lower solubility of oils and tackifying resins in the polymer itself giving a lower tendency to partition such compounding ingredients out of adjacent adhesives. This attribute combined with high stiffness, high flow, and good elasticity make this polymer useful for personal hygiene applications. It has also been desired to have a polymer which can be blended with large amounts of polystyrene and remain elastomeric for low cost elastomeric compounding solutions. Compounds containing up to 50% polystyrene exhibit high rubber stiffness and elastomeric behavior. Another feature of such a polymer is a lower hardness than prior art, which combined with improved rubber stiffness, makes this polymer useful for molded and extruded goods as well as for over molding. Still another feature of such a polymer is the ability to tune the rubber Tg depending on the amount of styrene incorporated in the rubber mid block. This attribute could be useful in sound and vibration dampening applications where energy dissipation must be tunable to the frequency of the sound or vibration. A polymer with a high rubber Tg is also useful for certain packaging applications like shrink-wrap film or candy wrap film. One of the benefits to having an elastomer with at least 75% polystyrene content is that the elastomer will carry FDA approval of a "plastic" so it will be approved for direct food contact including fatty foods. This factor, along with low $O_2$ and $CO_2$ permeability will make the polymer useful for food wrap film as well.

The controlled distribution copolymers of the present invention offer additional advantages in their ability to be easily processed using equipment generally designed for processing thermoplastic polystyrene, which is one of the most widely known and used alkenyl arene polymers. Melt processing can be accomplished via extrusion or injection molding using either single screw or twin screw techniques that are common to the thermoplastics industry. Solution or spin casting techniques can also be used as appropriate.

Finally, the copolymers of the present invention can be compounded with other components not adversely affecting the copolymer properties. Exemplary materials that could be used as additional components would include, without limitation, pigments, antioxidants, stabilizers, surfactants, waxes, and flow promoters. The polymers of the present invention are useful in a wide variety of applications including, for example, molded and extruded goods such as toys, grips, handles, shoe soles, tubing, sporting goods, sealants, gaskets, and oil gels. The compositions also find use as rubber toughening agents for polyolefins, polyvinyl chloride, polystyrene, polyamide, polyurethane, polyester, polycarbonate and epoxy resins. The polymers of the present invention are also useful in alloys and blends, and as compatibilizers for a variety of polymers and other materials.

DETAILED DESCRIPTION OF THE PREFERRED EMBODIMENTS

The key component of the present invention is the novel unhydrogenated block copolymer containing mono alkenyl arene end blocks and a unique midblock of a mono alkenyl arene and a conjugated diene. Surprisingly, the combination of (1) a unique control for the monomer addition and (2) the use of diethyl ether or other modifiers as a component of the solvent (which will be referred to as "distribution agents") results in a characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e. having a greater than average amount of) mono alkenyl arene units; and (3) an overall structure having relatively low blockiness. For purposes thereof, "rich in" is defined as greater than the average amount, preferably greater than 5% the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times (Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately constituted controlled distribution copolymer region will tend to improve flow and processability. Modification of certain other properties is also achievable.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

As discussed above, the controlled distribution polymer block has diene rich region(s) adjacent to the A block and an arene rich region not adjacent to the A block, and typically near the center of the block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. Another way to express this is the proportion of mono alkenyl arene units increases gradually along the polymer chain to a maximum near the middle or center of the block (if we are describing an ABA structure) and then decreases gradually until the polymer block is fully polymerized. This structure is distinct and different from the tapered and/or random structures discussed in the prior art.

For the controlled distribution block B the weight percent of mono alkenyl arene in each B block is between about 10 percent and about 75, preferably about 20 percent to about 75 percent. For the overall total polymer the weight percent mono alkenyl arene is about 20 to about 80 percent, preferably about 35 to about 80 percent.

As used herein, "thermoplastic block copolymer" is defined as a block copolymer having at least one block of a mono alkenyl arene, such as styrene and at least one block of a controlled distribution copolymer of diene and mono alkenyl arene. The method to prepare this thermoplastic block copolymer is via any of the methods generally known for block polymerizations. Reference is made to copending patent application Ser. No. 60/355,210 and its continuing application for details on the preparation of the block copolymers used in this application. The present invention includes as an embodiment a thermoplastic copolymer composition, which may be either a di-block, tri-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_nX$, or $(A-B-A)_nX$, or various types of structures can be combined in a mixture. For example, when employing a silane, such as tetra ethoxy-silane as a coupling agent, the resulting polymer is typically a mixture of linear coupled product, i.e. $(A-B)_2X$, and about 10 to 30% weight of the three arm radial polymer, i.e. $(A-B)_3X$. Some A-B diblock polymer can be present but preferably at least about 70 weight percent of the block copolymer is A-B-A or radial (or otherwise branched so as to have 2 or more terminal resinous blocks per molecule) so as to impart strength.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2 X$ block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 500,000, and for the radial copolymer from about 60,000 to about 600,000. These molecular weights are most accurately determined by light scattering measurements, and are expressed as number average molecular weights.

An important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis. For the unsaturated block copolymerized in this application, preferably about 20 to about 40 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

An important feature of the thermoplastic elastomeric di-block and tri-block polymers of the present invention, including one or more controlled distribution diene/alkenyl arene copolymer blocks and one or more mono alkenyl arene blocks, is that they have at least two Tg's, the lower being the single Tg of the controlled distribution copolymer block which is an intermediate of its constituent monomers'Tg's. Such Tg is preferably at least about −60 degrees C., more preferably from about −40 degrees C. to about +30 degrees C. The second Tg, that of the mono alkenyl arene "glassy" block, is preferably more than about +70 degrees C., more preferably from about +75 degrees C. to about +110 degrees C. The presence of the two Tg's, illustrative of the microphase separation of the blocks, contributes to the notable elasticity and strength of the material in a wide variety of applications, and its ease of processing and desirable melt-flow characteristics.

One of the surprising compositions of the present invention is the combination of the block copolymer and a polymer extending oil. While in the absence of oil, these polymers exhibit a stiffer elastomeric behavior than a traditional triblock polymer, in the presence of oil they exhibit a softer elastomeric behavior. Especially preferred are the types of oil that are compatible with the elastomeric segment of the block copolymer. While oils of higher aromatics content are satisfactory, those petroleum-based white oils having low volatility and less than 50% aromatic content are preferred. Typical paraffinic processing oils can be used to soften and extend polymers of the present invention; however, processing oils with a higher naphthenic content are more compatible with the controlled distribution rubber block. Processing oils with a naphthenic content between 40% and 55% and an aromatic content less than 10% are preferred. The oils should additionally have low volatility, preferable having an initial boiling point above about 500° F. The amount of oil employed varies from about 0 to about 300 parts by weight per hundred parts by weight rubber, or block copolymer, preferably about 20 to about 150 parts by weight.

The block copolymers of the present invention may be blended with a large variety of other polymers, including olefin polymers, styrene polymers, tackifying resins, and engineering thermoplastic resins.

In addition, the controlled distribution polymers of the present invention may be blended with conventional styrene/diene and hydrogenated styrene/diene block copolymers, such as the block copolymers available from KRATON Polymers. These block copolymers include linear S-B-S, S-I-S, S-EB-S, S-EP-S block copolymers. Also included are radial block copolymers based on styrene along with isoprene and/or butadiene and selectively hydrogenated radial block copolymers.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, styrene/methyl-methacrylate copolymers and styrene/olefin copolymers. Representative styrene/olefin copolymers are substantially random ethylene/styrene copolymers, preferably containing at least 10, more preferably equal to or greater than 25 weight percent copolymerized styrene monomer. Also included are styrene-grafted polypropylene polymers, such as those offered under the tradename Interloy® polymers, originally developed by Himont, Inc. (now Basell).

For the purposes of the specification and claims, the term "engineering thermoplastic resin" encompasses the various polymers found in the classes listed in Table A below, and further defined in U.S. Pat. No. 4,107,131, the disclosure of which is hereby incorporated by reference.

TABLE A

| | |
|---|---|
| 1. | Thermoplastic Polyester |
| 2. | Thermoplastic Polyurethane |
| 3. | Poly(aryl ether) and Poly(aryl sulfone) |
| 4. | Polycarbonate |
| 5. | Acetal resin |
| 6. | Polyamide |
| 7. | Halogenated thermoplastic |
| 8. | Nitrile barrier resin |
| 9. | Poly(methyl methacrylate) |
| 10. | Cyclic olefin copolymers |

Tackifying resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON".

The polymer blends of the present invention may be compounded further with other polymers, oils, fillers, reinforcements, antioxidants, stabilizers, fire retardants, antiblocking agents, lubricants and other rubber and plastic compounding ingredients without departing from the scope of this invention.

Examples of various fillers that can be employed are found in the 1971-1972 Modern Plastics Encyclopedia, pages 240-247. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight glass fibers, based on the total weight of the resulting reinforced blend. Coupling agents, such as various silanes, may be employed in the preparation of the reinforced blends.

Regarding the relative amounts of the various ingredients, this will depend in part upon the particular end use and on the particular block copolymer that is selected for the particular end use. Table B below shows some notional compositions expressed in percent weight, which are included in the present invention. For the "Polymer" amount, a portion may include conventional styrene block copolymers:

TABLE B

Applications, Compositions and Ranges

| Application | Ingredients | Composition % w. |
|---|---|---|
| Films, Molding, Alloys | Polymer | 1-99% |
| | Ethylene copolymers: EVA, Ethylene/styrene | 99-1% |
| Personal Hygiene Films and Fibers | Polymer | 10-75% |
| | PE | 0-30% |
| | PP | 0-30% |
| | Tackifying Resin | 5-30% |
| | End Block Resin | 5-20% |
| Personal Hygiene Films and Fibers | Polymer | 50-90% |
| | PE | 5-30% |
| | Tackifying Resin | 0-40% |
| Personal Hygiene Films and Fibers | Polymer | 45-90% |
| | PS | 10-50% |
| | Oil | 0-30% |
| Injection Molded articles | Polymer | 50-100% |
| | Polyolefin | 0-50% |
| | PS | 0-50% |
| | Oil | 0-50% |
| Injection molded/extrusion | Polymer | 50-100% |
| | PPO | 0-50% |
| | PS | 0-50% |
| | Engineering Plastic | 0-50% |
| | Filler | 0-50% |
| | Oil | 0-50% |
| Cap Seals | Polymer | 25-90% |
| | Oil and/or Tackifying Resin | 0-50% |
| | PP | 0-50% |
| | Filler | 0-25% |
| | Lubricant | 0 to 3% |
| Engineering Thermoplastic toughening | Polymer or Maleated Polymer | 5-30% |
| | Engineering thermoplastic, e.g. Nylon 6,6, TPU | 70-95% |
| Dipped Goods | Polymer | 60-100% |
| | Plasticizer, oil | 0-40% |
| Polymer Modification | Polymer | 5-95% |
| | ABS, PS, HIPS, Cyclic olefin copolymers | 95-5% |

The polymer of the present invention may be used in a large number of applications, either as a neat polymer or in a compound. The following various end uses and/or processes are meant to be illustrative, and not limiting to the present invention:

Polymer modification applications
Injection molding of toys, medical devices
Extruding films, tubing, profiles
Over molding applications for personal care, grips, soft touch applications, for automotive parts, such as airbags, steering wheels, etc
Dipped goods, such as gloves
Thermoset applications, such as in sheet molding compounds or bulk molding compounds for trays
Roto molding for toys and other articles
Slush molding of automotive skins
Thermal spraying for coatings
Blown film for medical devices
Transparent tubing for medical purposes having improved kink resistance
Blow molding for automotive/industrial parts
Films and fibers for personal hygiene applications

EXAMPLES

The following examples are provided to illustrate the present invention. The examples are not intended to limit the scope of the present invention and they should not be so interpreted. Amounts are in weight parts or weight percentages unless otherwise indicated.

Example 1

Various controlled distribution block copolymers of the present invention were prepared according to the process disclosed in illustrative Embodiment #III of the continuing and copending patent application to Ser. No. 60/355,210 referenced above and filed concurrently with this application. All polymers are unsaturated block copolymers where the A blocks are polystyrene blocks and the B blocks are styrene/butadiene controlled distribution blocks having terminal regions adjacent to the A blocks that are rich in butadiene units and other regions not adjacent to the A blocks that are rich in styrene units. All polymers were coupled polymers, where the coupling agent was tetra ethoxy-silane. Under the polymerization conditions the predominant species is the linear product, i.e. $(A-B)_2X$, although about 10 to 30 weight percent of the 3-armed radial product, i.e. $(A-B)_3X$ is also formed, along with some uncoupled diblock, i.e. A-B. For purposes herein, the coupling agent residue or remnant can be ignored. The various polymers are shown in Table 1 below. These polymers were then used in the various applications described in the other Examples. Tables 1 and 1a list the various analytical results for the unsaturated polymers. Block I MW is the molecular weight of the first A or polystyrene block in units of 1000, Block II MW is the cumulative molecular weight of the B or controlled distribution block in units of 1000 and Block III MW is the molecular weight of the final A or polystyrene block in units of 1000. Regarding Step II MW, the first number is the 1,3-butadiene portion and the second number is the styrene portion. For example, in Polymer #16 the B block has a molecular weight of 85,000 butadiene and 31,000 styrene, for a total of 116,000. The 1,2-vinyl configuration is given as 23.5 mol percent, along with the weight percent styrene in the entire polymer and in the mid block. For example, for Polymer #16, the entire polymer has about 42 weight percent styrene and the mid-block has about 27 weight percent styrene ("Calc. Mid PSC" in Table 1a). Coupling efficiency (or CE) is given for each polymer. The styrene blockiness for each polymer is calculated and shown in Table 1a ("Calc. Mid Blocky"). Finally the melt flow rate is given for some of the polymers.

Example 2

In this example one controlled distribution block copolymer (Polymer #17) was compared against a commercial sample of Styroflex® BX6105, an unsaturated SBS block copolymer from BASF, which has a random styrene/butadiene mid-block. Polymer #17 is made with a controlled distribution styrene/butadiene mid-block according to the present invention. Both have similar overall styrene contents as shown in Table 2. As shown in Table 2, Polymer #17 has a much improved melt flow measured under 200° C./5 kg conditions. Hardness and haze were measured on injection molded plaques with melt temperatures/injection pressures of 204° C./1000 psi and 190° C./800 psi for Styroflex and Polymer #17, respectively. Polymer #17 has a lower shore A hardness by approximately 20 points and 57% lower haze than Styroflex. Mechanical properties were measured on compression-molded plaques pressed at 175° C. and 1250 psi. Even though the tensile strengths are nearly identical, Polymer #17 has a higher elongation at break. Polymer #17 is also more compliant than Styroflex as indicated by the consistently lower moduli between 25% and 500%. Under a cyclic loading condition, Polymer #17 is more elastic as it recovers twice as much energy with half the permanent set of Styroflex.

The controlled distribution polymer #17 clearly exhibits much lower stress at low elongations compared to Styroflex, a polymer typical of the current art of randomized mid block polymers with a similar total styrene content. The stiffness at low elongations is typically characterized by the tensile modulus, or Young's modulus. For example the Young's modulus of polymer #17 is only 1,400 psi (10 MPa) while for Styroflex is 5,000 psi (35 MPa). The rubber modulus, or slope between 100 and 300% elongation for polymer #17 is slightly higher, 94 psi (0.65 MPa), than for Styroflex, 90 psi (0.62 MPA). Thus the controlled distribution polymer retains the stiff stretch at high elongations and high tensile strength of a random polymer but with the added benefit of much more elastic behavior at low elongations.

Example 3

In this example two different controlled distribution block copolymers (Polymer #19 and Polymer #17) were blended online (compound 3-1 comprising 100 percent Polymer #19 and compound 3-2 comprising 70 percent Polymer #17 and 30 weight percent of KRATON D-1403, a 75% weight styrene content styrene/butadiene block copolymer) and extruded into film using a cast film line. Both compounds have high levels of polystyrene (over about 70 weight percent). Test results are shown in Table 3. Due to processing-induced orientation, Compound 3-1 exhibits a distinct yield point in both machine and transverse directions with a mechanical response similar to a polyolefin, while compound 3-2 is more elastomeric. Both film compounds have high tensile strengths making them suitable for food wrap and flexible packaging film applications. Compound 3-2 also demonstrates good cling characteristics. In cases where the PSC is over 70%, it is possible to obtain polymer with a distinct yield point depending on processing conditions. Using this attribute either a semi-rigid or flexible film can be made.

Example 4

In this example one controlled distribution block copolymer (Polymer #17) was prepared into a solvent cast film from a 10% wt. toluene solution. Oxygen and carbon dioxide permeability coefficients are shown in Table 4 along with reported values for LDPE (0.914 density) and polystyrene. The units are $10^{13}$ cm$^3$×cm/cm$^2$×S×Pa. As shown in Table 4, the controlled distribution polymer of the present invention has permeability coefficients that are of the same order as those reported for LDPE and PS.

Example 5

Blends of a controlled distribution Polymer #17 (containing 63% total polystyrene) were made with homopolystyrene having 13 melt index, Chevron-Phillips MC3600. In Table 5 examples 5-2 through 5-6 show that surprisingly, the addition of up to about 40 wt % homopolystyrene still results in an elastic film with good recovery and low permanent set. The total styrene content of the film 5-5 is nearly 78%. It is well known in the art that block copolymer films with a majority of polystyrene content are plastic rather than elastic. Examples 5-2 through 5-6 were prepared in a Brabender mixing head. Of particular note is the recovery of more than 50% of the strain energy and only 14% permanent set after elongation to 100% for homopolystyrene contents less than 50%. Blend 5-7 shows that the addition of oil can be used to reduce the modulus of the blend and improve its recovery.

Also shown in Table 5 is data for poly(vinyl chloride) ("PVC"). Compounds 5-3, 5-4 and 5-5 resemble the performance of PVC with similar hardness, improved tensile strengths, and improved hysteresis with comparable stiffness.

In addition the high styrene content of the blends allows them to be painted and printed on directly without pretreatment.

Example 6

In Example 6 controlled distribution block copolymers #17, 19 and 20 were compounded with varying amounts of a polypropylene homopolymer (PP 5A15H), a polystyrene homopolymer (Chevron-Phillips MC3600), a paraffinic oil (Drakeol® 34), and a naphthenic oil (Renoil® 471) as shown in Table 6. The compounds were prepared using a Brabender mixing head followed by compression molding at 175° C. As shown in Table 6, compounds can be prepared with polystyrene and polypropylene with or without oil to have high tensile strengths and various hardnesses.

Example 7

In Example 7 Chevron-Phillips MC3600 homopolystyrene was compounded with a controlled distribution polymer in a single screw extruder film line. The controlled distribution polymer #17 was tumbled with homopolystyrene pellets and the mixture was fed into the extruder operating under standard conditions for film formation. The screw in the extruder was a normal compression screw with no mixing elements. The films were tested according to ASTM D412 in the machine and transverse directions. In these blends orientation is apparent in the machine direction resulting in very stiff films. In the transverse direction, however, the films remain elastic with good recovery. The high styrene contents of these films also allows adhesives to be used against the film without degradation of the adhesive properties. To demonstrate this feature, a film of sample 7-3 was aged at 65° C. for two weeks in contact with an adhesive composed of 25% SIS polymer, 60% tackifying resin and 15% oil. The peel strength after aging dropped from 4.2 pli to 2.9 pli. The adhesive was analyzed afterward and found to contain approximately 39% SIS polymer and 61% combined tackifying resin and oil. This indicates that some of the tackifying resin and oil had been absorbed into the 7-2 film, thus explaining the loss of adhesion. By comparison a typical elastomeric film based on a traditional SEBS block copolymer lost all of its adhesion after aging in contact with the same adhesive for two weeks at 65° C. After aging the adhesive was found to contain 83% SIS polymer and 17% tackifying resin and oil. This indicated that almost all of the tackifying resin and oil had migrated into the elastomeric film destroying the adhesion.

Example 8

In this example one controlled distribution block copolymer (Polymer #19) was prepared into cast film on a single screw extruder equipped with a chill roll, nip rollers, and a coat hanger film die. The sample was prepared with the chill roll operating at 30 rpm and the nip rollers at 50 rpm. Samples were then drawn to either 100% or 200% strain at 25° C. and/or 50° C. as shown in Table 8 below. Drawn samples were allowed to equilibrate at 25° C. for two hours prior to submersion in 40° C. water for 30 seconds. Prior to submersion in the water, bench marks were placed on the sample so that a percent shrinkage could be determined as ((length after submersion—length prior to submersion)/length prior to submersion). The as cast, undrawn control exhibits 6% shrinkage after 30 seconds in 40° C. water. Film drawn to 200% strain at 25° C. exhibits approximately 38% shrinkage after 30 seconds at 40° C. The effect of shrinkage temperature was also evaluated on the film drawn to 200% strain at 25° C. Shrinkage of approximately 54% is observed after submersion in 70° C. water for 30 seconds. As shrinkage occurs in the machine directions, expansion also occurs in the transverse direction of 34%. Finally, the natural shrinkage of the film was measured by drawing the as cast film to 100% strain and measuring the shrinkage at 25° C. on an unconstrained film. After 60 minutes the film exhibits a natural shrinkage of approximately 37%.

Example 9

Controlled distribution, styrenic block copolymers of the present invention offer processing advantages when used as modifiers for styrene monomer based thermoset applications. As shown in Table 9, controlled distribution Polymers #17 and #19 afforded lower viscosity solutions in styrene monomer (15% wt polymer, 25° C.) than did Comparative S-B-S Polymer I ("CP I"), a linear styrene-butadiene-styrene triblock copolymer; this inspite of the controlled distribution polymers being over 75% higher in molecular weight. When compared to a linear S-B-S polymer more their size, Comparative S-B-S Polymer II ("CP II"), Polymers #17 and #19 afforded solution viscosities that were less than 25% of that of conventional polymer. Clearly the styrene solutions of Polymers #17 and #19 will be easier to handle, more freely flowing, than similar solutions prepared from Comparative S-B-S Polymer II. In Table 9, the Brookfield viscosity is measured with Spindle 21 at 100 rpm, and PSC is the polystyrene content of the block copolymer.

Illustrative embodiment Polymer #20 had a much lower styrene content than did Polymers #17 and #19. Though polymer #20 was lower in MW than either #17 or #19, the viscosity of a styrene solution of Polymer #20 was more than twice that of either of the larger polymers. These results support the hypothesis that polymers of the current invention which have higher styrene levels will be preferred over polymers having styrene levels below 50% wt. The higher in styrene content, controlled distribution polymers will be easier to process in styrene based thermoset systems than analogous polymers having styrene contents below 50% wt.

In view of the viscosity performance in styrene monomer, it is expected that the controlled distribution polymers of the present invention would be good candidates for sheet molding compound (SMC) and bulk molding compound (BMC) applications. See, e.g., U.S. Pat. No. 4,400,478, which is herein incorporated by reference, which discloses formulations and technology for employing block copolymers in SMC and BMC applications.

Example 10

In Example 10 a controlled distribution polymer of the present invention (Polymer #17) was compounded with a polypropylene homopolymer (Novolene 100 UC) in order to determine its suitability in slush molding applications (amounts are in parts by weight). The compound (10-2) was compared with a compound based on Styroflex BX-6105 (10-1). As shown in Table 10, the properties of the two compounds are similar, but the melt flow for the compound based on the controlled distribution polymer is significantly higher, making it a better candidate for slush molding applications.

Example 11

In Example 11 a controlled distribution copolymer was used in a compound for overmolding on various substrates, and was used as a neat polymer for overmolding, and was compared with a commercial formulation used in overmolding. The substrates used for the testing were Nylon 6 (N6), high impact polystyrene (HIPS) and an acrylonitrile butadiene styrene terpolymer (ABS).

In compound 11-1, a maleated hydrogenated block copolymer (KRATON 1901X) was compounded with controlled distribution copolymer #17, Renoil 471 oil and calcium carbonate. Compound 11-2 is a commercial overmolding compound based on KRATON 1901X and a selectively hydrogenated SBS block.

Substrates were injection molded using a Krauss Maffai molding machine. Nylon 6 was dried under vacuum for 24 hours at 180 F. before molding. ABS was dried under vacuum for 2 hours at 180 F. before molding. Selected materials were then over molded onto the substrates using the Krauss Maffai molding machine.

Over molded plaques were cut into 1 inch strips. Approximately ½ inch of the over molded material was peeled back from the substrate. The peeled part of the substrate was then bent, in a heated press, to a 90 degree angle. Five strips of each material were tested for 90 degree peel strength using an Instron 1120 tensile tester. The test was run at 2 inches per minute. Average initial peel strengths are shown in Table 12.

The results indicate that for ABS and HIPS substrates, the neat unsaturated Polymer #17 performs even better than the commercial over molding compound and much better than the 11-1 compound. Results with Nylon 6 show almost equivalent performance with the commercial over molding compound. The neat Polymer #17 also maintains a superior clarity over both the commercial compound and the 11-1 compound blend.

Example 12

In Example 12 three different controlled distribution polymers were compounded with varying amounts of polystyrene (PS) and styrene/methyl methacrylate (SMMA) polymers to determine the effect on overall properties. The three controlled distribution polymers were Polymers 17, 19 and 20. The polystyrene was EB 3300 from Chevron Phillips and the SMMA was CET-130 from Resirene. Also used was KRATON D 1403, a high styrene content styrene/butadiene block copolymer having a PSC of about 75% weight; KR03, a high styrene block copolymer from Chevron Phillips having a styrene content of about 75% weight; Finaclear 520 from Fina having a styrene content of about 73%; and Styrolux 3G55 from BASF, also having a styrene content of about 75% weight. The various components were first dry blended, and the blend was injection molded on an Engel injection molding machine. The tensile properties were tested based on ASTM D-638, and the optical properties were tested based on ASTM D-1003. The results and various formulations (expressed as percent by weight) are listed in Table 13.

With regard to the 100% polymer comparisons, all polymers had approximately the same styrene contents. However, Polymer #19 according to the present invention had higher elongation than D1403, KR03, and Styrolux 3G55. Regarding the 50/50 blends, the blend with Polymer #19 had the highest elongation, i.e. more than 10 times higher than the elongation of a blend of PS with a conventional high styrene-content SBS block copolymer-D 1403, and higher than the competitive blends.

In 70/30 blends with SMMA polymers, the elongation for blends with Polymer #19 was nearly twice that for the blend with D-1403.

These comparisons show that Polymer #19 may have higher efficiency in modifying PS and SMMA to make rigid packaging products and molded goods, i.e. you will need less styrene block copolymer to modify the PS or SMMA when using the controlled distribution polymers of the present invention.

Example 13

Some polymers of the current invention may be used as damping materials. For damping applications it is important to have a glass transition temperature as measured by dynamic mechanical testing in the range of −10° C. to +30° C. It is also important to be able to readily tune the glass transition temperature to achieve damping either of selected frequencies or at selected temperatures. Table 14 shows that the Tg of Polymer #17 is 4.6° C., which is in the range commonly used for damping. Example 14-2 and 14-3 show that the Tg can be readily increased by the addition of a midblock resin such as Regalrez 1085 or an end block resin such as Kristallex 1120. Example 14-4 and 14-5 show that the addition of oil reduces the Tg of the polymer whether or not there is a homopolystyrene present. Increases in Tg are accompanied by increasing stiffness and conversely decreased Tg's are accompanied by decreasing stiffness. In all cases good strength and elongation are maintained.

TABLE 1

Analytical Results for Unsaturated S/Bd Mid-Block Polymers

| Polymer No. | Block I MW | Block II MW | Block III MW | Distribution Agent | 1,2-BD (%) | PSC (%) | CE (%) | MFR (200 C/5 kg) (g/10 min) |
|---|---|---|---|---|---|---|---|---|
| 16 | 15.5 | 85/31 | 15.5 | DEE | 23.5 | 42 | >90 | 0.6 |
| 17 | 15.6 | 50/50 | 15.6 | DEE | 24.6 | 63 | >90 | 17.6 |
| 18 | 11.7 | 75/25 | 11.7 | nBE | 22.8 | 40 | 70 | 10.8 |
| 19 | 21 | 38/69 | 21 | DEE | 24.3 | 76 | 95 | 11.7 |
| 20 | 12.5 | 78/25 | 12.5 | ODMB | 23.7 | 38.8 | 92 | |
| 21 | 21.2 | 36/65 | 21.2 | DEE | 32.6 | 76 | 95 | |
| 22 | 20.1 | 30/65 | 20.1 | ODMB | 30 | 74 | 94 | |
| 23 | 14.8 | 49/49 | 14.8 | ODMB | 25 | 64.5 | 90 | |

TABLE 1a

NMR Results for Polymers at the end of Step II

| Polymer Number | Expt. NMR PSC | Expt. NMR Blocky | Calc. Mid PSC | Calc. Mid Blocky |
|---|---|---|---|---|
| 16 | 42.3 | 56 | 26.9 | 12 |
| 17 | 61.8 | 45 | 49.9 | 11 |
| 18 | 40.0 | 59 | 26.0 | 22 |
| 19 | 75.4 | 56 | 65.7 | 30 |
| 20 | 38.7 | 57 | 23.8 | 13 |
| 21 | 76.9 | 55 | 67.1 | 27 |
| 22 | 74.3 | 59 | 63.4 | 32 |
| 23 | 64.5 | 57 | 53.8 | 33 |

TABLE 2

|  | Polymer #17 | Styroflex BX6105 |
| --- | --- | --- |
| PSC (%) | 63 | 66 |
| MFR (g/10 min) | 17.7 | 10.5 |
| Shore A Hardness (10s) | 62 | 84 |
| Haze (%) | 21.8 | 51.3 |
| Tensile |  |  |
| TS (psi) | 4298 | 4338 |
| Elongation (%) | 950 | 734 |
| 25% Modulus (psi) | 152 | 429 |
| 50% Modulus (psi) | 203 | 465 |
| 100% Modulus (psi) | 255 | 524 |
| 200% Modulus (psi) | 366 | 760 |
| 300% Modulus (psi) | 517 | 1122 |
| 500% Modulus (psi) | 917 | 2125 |
| 150% Hysteresis |  |  |
| Recovered Energy (%) | 59.1 | 30.7 |
| Permanent Set (%) | 18.9 | 38.9 |

TABLE 3

|  | Compound Number | |
| --- | --- | --- |
|  | 3-1 | 3-2 |
| Polymer #19 | 100 |  |
| Polymer #17 |  | 70 |
| D1403 |  | 30 |
| Tensile (MD) |  |  |
| Tensile Strength (psi) | 3785 | 3685 |
| Elongation (%) | 397 | 464 |
| 100% Modulus (psi) | 1577 | 988 |
| 300% Modulus (psi) | 2929 | 1918 |
| Tensile (TD) |  |  |
| Tensile Strength (psi) | 3650 | 4020 |
| Elongation (%) | 390 | 560 |
| 100% Modulus (psi) | 1545 | 455 |
| 300% Modulus (psi) | 2846 | 1170 |
| 100% Hysteresis (MD) |  |  |
| Recovered Energy (%) | 4.7 | 18 |
| Permanent Set (%) | 86 | 45 |
| 100% Hysteresis (TD) |  |  |
| Recovered Energy (%) | 4.6 | 36 |
| Permanent Set (%) | 86 | 21 |
| 200% Hysteresis (MD) |  |  |
| Recovered Energy (%) | 5.2 | 15 |
| Permanent Set (%) | 168 | 102 |
| 200% Hysteresis (TD) |  |  |
| Recovered Energy (%) | 5.1 | 34 |
| Permanent Set (%) | 168 | 41 |

TABLE 4

|  | Carbon Dioxide Permeability Coefficient | Oxygen Permeability Coefficient |
| --- | --- | --- |
| Polymer #17 | 15.6 | 2.0 |
| LDPE | 9.5 | 2.2 |
| PS | 7.9 | 1.9 |

TABLE 5

|  | Compound Number | | | | | | | | |
| --- | --- | --- | --- | --- | --- | --- | --- | --- | --- |
|  | 5-1 | 5-2 | 5-3 | 5-4 | 5-5 | 5-6 | 5-7 | 5-8 | PVC |
| Polymer #17 | 100 | 90 | 80 | 68 | 60 | 50 | 61.2 | 61.2 |  |
| PS (MC3600) |  | 10 | 20 | 32 | 40 | 50 | 28.8 | 28.8 |  |
| Drakeol 34 |  |  |  |  |  |  | 10 |  |  |
| Renoil 471 |  |  |  |  |  |  |  | 10 |  |
| Tensile |  |  |  |  |  |  |  |  |  |
| Tensile Strength (psi) | 4298 | 3492 | 3780 | 4088 | 3251 | 2192 | 2992 | 2888 | 2168 |
| Elongation (%) | 950 | 770 | 604 | 534 | 404 | 229 | 713 | 657 | 409 |
| 50% Modulus (psi) | 203 | 236 | 286 | 360 | 450 | 956 | 178 | 207 | 488 |
| 100% Modulus (psi) | 255 | 309 | 418 | 577 | 789 | 1372 | 273 | 308 | 751 |
| 200% Modulus (psi) | 366 | 491 | 816 | 1213 | 1620 | 2055 | 534 | 606 | 1196 |
| 100% Hysteresis |  |  |  |  |  |  |  |  |  |
| Peak Stress (psi) |  | 281 | 352 | 498 | 691 | 1229 | 288 | 252 |  |
| Recovered Energy (%) |  | 58.9 | 57.5 | 55.5 | 50.5 | 27.3 | 63.7 | 65.6 | 26 |
| Permanent Set (%) |  | 16.2 | 14.5 | 14.3 | 14.6 | 20.2 | 11.1 | 11.1 | 37 |
| Shore A Hardness (10s) |  |  | 71 | 73 | 75 |  |  |  | 70 |

TABLE 6

| | 6-1 | 6-2 | 6-3 | 6-4 | 6-5 | 6-6 | PVC |
|---|---|---|---|---|---|---|---|
| Compound Number | | | | | | | |
| Polymer # 17 | 61.2 | | | | 87 | 87 | |
| Polymer # 19 | | 100 | 95 | | | | |
| Polymer # 20 | | | | 70 | | | |
| PS (MC3600) | 28.8 | | 5 | 30 | | | |
| PP (5A15H) | | | | | | 13 | |
| Drakeol 34 | 10 | | | | | | |
| Renoil 471 | | | | | 13 | | |
| Shore A Hardness (10s) | 64 | 94.5 | | 67 | 65 | 47 | 70 |
| Tensile | | | | | | | |
| Tensile Strength (psi) | 2992 | 3670 | 4315 | 3187 | 4837 | 3394 | 2168 |
| Elongation (%) | 713 | 447 | 457 | 807 | 874 | 1070 | 409 |
| 50% Modulus (psi) | 178 | 1228 | 1266 | 223 | 272 | 138 | 488 |
| 100% Modulus (psi) | 273 | 1370 | 1493 | 302 | 370 | 170 | 751 |
| 200% Modulus (psi) | 534 | 1922 | 2160 | 536 | 624 | 225 | 1196 |
| 100% Hysteresis | | | | | | | |
| Peak Stress (psi) | 288 | | | | | | |
| Recovered Energy (%) | 63.7 | | | | | | 26 |
| Permanent Set (%) | 11.1 | | | | | | 37 |

TABLE 7

Cast Films Mixed in the Extruder

| | Compound # | | | | | | | |
|---|---|---|---|---|---|---|---|---|
| | 7-1 | | 7-2 | | 7-3 | | 7-4 | |
| Polymer 17, % w | 100 | | 80 | | 70 | | 60 | |
| PS, % w | 0 | | 20 | | 30 | | 40 | |
| Tensile | MD | TD | MD | TD | MD | TD | MD | TD |
| Tensile Strength (psi) | 4527 | 4518 | 4207 | 4542 | 4000 | 4300 | 3656 | 4690 |
| Elongation (%) | 733 | 746 | 439 | 513 | 406 | 537 | 283 | 396 |
| 25% Modulus (psi) | 201 | 191 | 603 | 285 | 731 | 310 | 1367 | 543 |
| 50% Modulus (psi) | 249 | 231 | 767 | 357 | 916 | 391 | 1626 | 713 |
| 100% Modulus (psi) | 293 | 270 | 1060 | 493 | 1240 | 540 | 2060 | 1060 |
| 200% Modulus (psi) | 408 | 373 | 1730 | 978 | 1930 | 1030 | 2890 | 2140 |
| 300% Modulus (psi) | 584 | 535 | 2550 | 1860 | 2750 | 1840 | 3870 | 3390 |
| 500% Modulus (psi) | 1410 | 1321 | | | 4300 | | 3410 | |
| 100% Hysteresis | | | | | | | | |
| Peak Stress (psi) | 365 | 332 | 1160 | 488 | 1287 | 553 | 2167 | 992 |
| Recovered Energy (%) | 37.4 | 42 | 20.8 | 45 | 16.7 | 41.7 | 9.9 | 30.4 |
| Permanent Set (%) | 25.6 | 23.3 | 38.3 | 17 | 47.5 | 18.3 | 69 | 24.6 |

TABLE 8

Shrink Performance of Polymer # 19 Cast Film

| | Natural shrinkage at 25° C. (%) | |
|---|---|---|
| 30 minutes | 34.4 | |
| 60 minutes | 36.7 | |

| | 30 s MD Shrinkage (%) at 40° C. | |
|---|---|---|
| Undrawn Control | 6.3 | |
| Drawn to 100% Strain at 25° C. | 23.3 | |
| Drawn to 100% Strain at 50° C. | 28.8 | |
| Drawn to 200% Strain at 25° C. | 37.7 | |

| Drawn to 200% Strain | 40° C. | 70° C. |
|---|---|---|
| 30s MD Shrinkage (%) | 37.7 | 53.6 |
| 30s TD Expansion (%) | 20 | 34 |

TABLE 9

Solution Viscosities at 15 wt % in Styrene (25° C.)

| Material | PSC | MW (10³) | Viscosity (cPs) |
|---|---|---|---|
| Polymer # 20 | 40% | 120 | 378 |
| Polymer # 17 | 63% | 128 | 153 |
| Polymer # 19 | 75% | 135 | 126 |
| CP I | 30% | 72 | 162 |
| CP II | 35% | 140 | 648 |

TABLE 10

Polymer # 17 comparison with Styroflex BX6105 in PP formulation

| Components | | 10-1 | 10-2 |
|---|---|---|---|
| Polymer # 17 | | — | 60 |
| Styroflex BX-6105 | | 60 | — |
| PP Novolene 1100 | | 40 | 40 |

| | | MD | PMD | MD | PMD |
|---|---|---|---|---|---|
| Yield | Mpa | 16.5 | 14.6 | 16.2 | 13.8 |
| Tensile Strength | Mpa | 19.3 | 21.7 | 16.7 | 20.2 |
| Mod 100% | Mpa | 570 | 660 | 560 | 700 |
| Mod 300% | Mpa | 14.4 | 13.1 | 14.3 | 13.3 |
| Mod 500% | Mpa | 14.8 | 13.8 | 14.4 | 13.2 |
| Elongation at break | % | 17.3 | 16.4 | 16.1 | 15.1 |
| MFR 230° C./2.16 kg | g/10' | 33 | | 38 | |

TABLE 11

| | 11-1 | |
|---|---|---|
| | PHR | % wt |
| KRATON 1901X | 70 | 41.01 |
| Polymer # 17 | 30 | 17.57 |
| Renoil 471 | 20 | 11.72 |
| Calcium Carbonate | 50 | 29.29 |

TABLE 12

| Material and substrate | Avg initial peel strength (pli) |
|---|---|
| 11-1 ABS | 1.5 |
| 11-1 N6 | 1.8 |
| 11-1 HIPS | 9.1 |
| Polymer 17 - ABS | 13.8 |
| Polymer 17 - N6 | 2.9 |
| Polymer 17 - HIPS | 20 |
| 11-2 ABS | 10.1 |
| 11-2 N6 | 3.6 |
| 11-2 HIPS | 13.3 |

TABLE 13

| SAMPLES: | Stress @ max. load, psi | Stress @ auto. break, psi | % Strain @ auto.break | Haze, % | Light trans., % |
|---|---|---|---|---|---|
| 100% polymer comparisons | | | | | |
| EB3300 PS, 100% | 9269.6 | 9232.9 | 3.96 | n/a | n/a |
| Polymer # 19, 100% | 2308 | 2307 | 338 | n/a | n/a |
| D1403, 100% | 4019.5 | 2998.1 | 153.8 | 1.9 | 90.0 |
| KR03, 100% | n/a | 2747 | 311 | 3.06 | 90.54 |
| STYROLUX 3G55, 100% | n/a | 2887 | 245 | 11 | 87.1 |
| FINACLEAR 520, 100% | | 2807 | >500 | 1.76 | 90.56 |
| 50/50 blend comparisons | | | | | |
| PS/D1403, 50/50 | 7296.2 | 6721.4 | 5.87 | 22.7 | 80.7 |
| PS/Polymer # 19, 50/50 | 4782.4 | 3563.1 | 62.6 | 28.9 (84.8% cal) | 71.3 |
| PS/KRO3, 50/50 | 6777.2 | 4415.3 | 12.4 | n/a | n/a |
| PS/STYROLUX 3G55, 50/50 | 5590.5 | 4005.4 | 25.7 | n/a | n/a |
| PS/FINACLEAR 520, 50/50 | 6617.9 | 4973.3 | 8.1 | n/a | n/a |
| 95/5 blend comparisons | | | | | |
| PS/D1155, 95/5 | 9028.2 | 9028.2 | 6.07 | 40.6 | 55.8 |
| PS/Polymer # 20, 95/5 | 8881.2 | 8881.2 | 3.42 | 54.1 (76%cal) | 51.4 |
| PS/Polymer # 17, 95/5 | 9086.9 | 9086.9 | 3.58 | 27.8 | 81.0 |
| 70/25/5 blend comparisons | | | | | |
| PS/D1403/D1155, 70/25/5 | 8103.4 | 7982.4 | 3.82 | 22.1 | 73.6 |
| PS/D1403/Polymer # 20, 70/25/5 | 7825.4 | 6947.8 | 5.48 | 19.5 | 64.0 |
| PS/D1403/Polymer # 17, 70/25/5 | 8090.4 | 7318.6 | 5.38 | 16.4 | 79.9 |
| 70/30 blends with SMMA comparisons | | | | | |
| CET-130 SMMA/D1403, 70/30 | 7845.8 | 7845.8 | 3.71 | 6.8 | 88.9 |
| CET-130 SMMA/Polymer # 19, 70/30 | 6961.9 | 6156.3 | 7.15 | n/a | n/a |

TABLE 14

| | Compound Number | | | | |
|---|---|---|---|---|---|
| | 14-1 | 14-2 | 14-3 | 14-4 | 14-5 |
| Polymer # 17 | 100 | 80 | 80 | 87 | 61.2 |
| Regalrez 1085 | | 20 | | | |
| Kristalex 1120 | | | 20 | | |
| Renoil 471 | | | | 13 | 10 |
| PS (MC3600) | | | | | 28.8 |
| Tensile | | | | | |
| Tensile Strength (psi) | 4298 | 3826 | 3601 | 3394 | 2888 |

TABLE 14-continued

| | Compound Number | | | | |
|---|---|---|---|---|---|
| | 14-1 | 14-2 | 14-3 | 14-4 | 14-5 |
| Elongation (%) | 950 | 972 | 859 | 1070 | 657 |
| 50% Modulus (psi) | 203 | 164 | 323 | 138 | 207 |
| 100% Modulus (psi) | 255 | 216 | 356 | 170 | 308 |
| 200% Modulus (psi) | 366 | 327 | 488 | 225 | 606 |
| TG (° C.) | 4.6 | 12.0 | 47.4 | −4.0 | −3.9 |

What is claimed:

1. An article comprising at least one unhydrogenated block copolymer and at least one other component selected from the group consisting of olefin polymers, polystyrene, tackifying resins, and polymer extending oils, wherein said block copolymer consists of at least one block A and at least one block B and wherein:

a. each A block is a mono alkenyl arene homopolymer block and each B block is a controlled distribution copolymer block of at least one conjugated diene and at least one mono alkenyl arene;

b. each A block having a number average molecular weight between about 3,000 and about 60,000 and each B block having a number average molecular weight between about 30,000 and about 300,000;
c. each B block comprises terminal regions adjacent to the A blocks that are rich in conjugated diene units and one or more regions not adjacent to the A blocks that are rich in mono alkenyl arene units;
d. the total amount of mono alkenyl arene in the block copolymer is about 20 percent weight to about 80 percent weight;
e. the weight percent of mono alkenyl arene in each B block is between about 17 percent and about 50 percent;
f. wherein the styrene blockiness index of the block B is less than about 10 percent; and
g. wherein about 20 to about 40 mol percent of the condensed conjugated diene units in the B block have 1,2- or 3,4-addition.

2. The article according to claim 1 wherein said mono alkenyl arene is styrene and said conjugated diene is selected from the group consisting of isoprene and butadiene.

3. The article according to claim 2 wherein said conjugated diene is butadiene.

4. The article according to claim 1 comprising 100 parts by weight of said block copolymer and about 5 to about 100 parts by weight of a polymer extending oil.

5. The article according to claim 1 comprising 100 parts by weight of said block copolymer and about 5 to about 100 parts by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

6. A film formed from the formulated composition of claim 1.

7. The article according to claim 1 also comprising an SBS or SIS copolymer.

8. The article according to claim 3 wherein the polymer is an ABA polymer and each block B has a center region with a minimum ratio of butadiene units to styrene units.

9. The article according to claim 4 wherein said polymer extending oil has a naphthenic content between 40 weight percent and 55 weight percent and an aromatic content less than 10 weight percent.

10. The article according to claim 5 also comprising about 5 to about 50 parts by weight of a tackifying resin.

11. The article according to claim 1 in the form of a fiber.

12. An article comprising at least one unsaturated block copolymer and at least one engineering thermoplastic resin, wherein said block copolymer consists of at least one block A and at least one block B and wherein:
a. each A block is a mono alkenyl arene homopolymer block and each B block is a controlled distribution copolymer block of at least one conjugated diene and at least one mono alkenyl arene;
b. each A block having a number average molecular weight between about 3,000 and about 60,000 and each B block having a number average molecular weight between about 30,000 and about 300,000;
c. each B block comprises terminal regions adjacent to the A blocks that are rich in conjugated diene units and one or more regions not adjacent to the A blocks that are rich in mono alkenyl arene units;
d. the total amount of mono alkenyl arene in the block copolymer is about 20 percent weight to about 80 percent weight;
e. the weight percent of mono alkenyl arene in each B block is between about 17 percent and about 50 percent;
f. wherein the styrene blockiness index of the block B is less than about 10 percent; and
g. wherein about 20 to about 40 mol percent of the condensed conjugated diene units in the B block have 1,2- or 3,4-addition.

13. The article according to claim 12 comprising 100 parts by weight of said block copolymer and about 5 to about 200 parts by weight of a polystyrene polymer selected from the group consisting of crystal polystyrene, high impact polystyrene, syndiotactic polystyrene, styrene/methyl-methacrylate copolymer and acrylonitrile/butadiene/styrene terpolymer.

14. The article according to claim 13 also comprising about 5 to about 50 parts by weight of a tackifying resin.

15. The article according to claim 12 comprising about 5 to 20 percent weight of said block copolymer and about 80 to about 95 percent weight of an engineering thermoplastic resin.

16. The article according to claim 15 wherein said engineering thermoplastic resin is selected from the group consisting of thermoplastic polyester, thermoplastic polyurethane, poly(arylether), poly(aryl sulfone), polycarbonate, acrylic resins, acetal resin, polyamide, halogenated thermoplastic, cyclic olefin copolymers and nitrile barrier resin.

17. The article according to claim 12 comprising about 5 to 95 percent weight of said block copolymer and about 95 to about 5 percent weight of a polystyrene homopolymer or copolymer.

18. The article according to claim 12 comprising 95 to 60 percent weight of said block copolymer and a polystyrene.

19. The article according to claim 18 wherein said polystyrene polymer is selected from the group consisting of crystal polystyrene, high impact polystyrene, syndiotactic polystyrene, styrene/methyl-methacrylate copolymer and acrylonitrile/butadiene/styrene terpolymer.

20. The article according to claim 19 wherein said polystyrene polymer is crystal polystyrene or high impact polystyrene.

21. The article according to claim 18 also comprising about 5 to about 100 parts by weight of a polymer extending oil for every 100 parts by weight of said block copolymer.

22. The article according to claim 21 in the form of a film.

23. An elastomeric laminate formed from the film of claim 22.

24. An article comprising at least one unsaturated block copolymer and at least one engineering thermoplastic resin, wherein said block copolymer consists of at least one block A and at least one block B and wherein:
a. each A block is a mono alkenyl arene homopolymer block and each B block is a controlled distribution copolymer block of at least one conjugated diene and at least one mono alkenyl arene;
a. each A block having a number average molecular weight between about 10,000 to about 30,000 and each B block having a number average molecular weight between about 30,000 and about 150,000;
b. each B block comprises terminal regions adjacent to the A blocks that are rich in conjugated diene units and one or more regions not adjacent to the A blocks that are rich in mono alkenyl arene units;
c. the total amount of mono alkenyl arene in the block copolymer is about 35 percent weight to about 80 percent weight;
d. the weight percent of mono alkenyl arene in each B block is between about about 17 percent and about 50 percent; and
wherein the styrene blockiness index of the block B is less than about 10 percent, wherein the conjugated diene is butadiene and from about 20 to about 40 mol percent of the condensed butadiene units in the B block have 1,2-configuration, wherein said block copolymer has the general configuration ABA, (A-B)$_n$, (A-B)$_n$A, (A-B)$_n$X or mixtures thereof where n is an integer from 2 to about 30, and X is the coupling agent residue.

25. The article according to claim 24 comprising 100 parts by weight of said block copolymer and about 5 to about 200 parts by weight of a polystyrene polymer selected from the group consisting of crystal polystyrene, high impact polystyrene, syndiotactic polystyrene, styrene/methyl-methacrylate copolymer and acrylonitrile/butadiene/styrene terpolymer.

26. The article according to claim 24 comprising 5 to 40 percent weight of said block copolymer and 60 to 95 percent weight of a polystyrene homopolymer or copolymer.

27. The article according to claim 26 wherein said polystyrene polymer is crystal polystyrene or high impact polystyrene.

28. The article according to claim 26 wherein said polystyrene polymer is a styrene/methyl-methacrylate copolymer.

29. The article according to claim 26 wherein said polystyrene polymer is an acrylonitrile/butadiene/styrene terpolymer.

30. An article comprising at least one unhydrogenated block copolymer and at least one other component selected from the group consisting of olefin polymers, polystyrene, tackifying resins, and polymer extending oils, wherein said block copolymer consists of at least one block A and at least one block B and wherein:
   a. each A block is a mono alkenyl arene homopolymer block and each B block is a controlled distribution copolymer block of at least one conjugated diene and at least one mono alkenyl arene;
   b. each A block having a number average molecular weight between about 10,000 to about 30,000 and each B block having a number average molecular weight between about 30,000 and about 300,000;
   c. each B block comprises terminal regions adjacent to the A blocks that are rich in conjugated diene units and one or more regions not adjacent to the A blocks that are rich in mono alkenyl arene units;
   d. the total amount of mono alkenyl arene in the block copolymer is about 20 percent weight to about 80 percent weight;
   e. the weight percent of mono alkenyl arene in each B block is between about about 17 percent and about 50 percent; and
wherein the styrene blockiness index of the block B is less than about 10 percent, wherein the conjugated diene is butadiene and from about 20 to about 40 mol percent of the condensed butadiene units in the B block have 1,2-configuration, wherein said block copolymer has the general configuration ABA, (A-B)$_n$, (A-B)$_n$A, (A-B)$_n$X or mixtures thereof where n is an integer from 2 to about 30, and X is the coupling agent residue.

31. A cap seal formed from a formulated composition having at least one unhydrogenated block copolymer and at least one other component selected from the group consisting of olefin polymers, polystyrene, tackifying resins, and polymer extending oils, wherein said block copolymer has at least one block A and at least one block B and wherein:
   a. each A block is a mono alkenyl arene homopolymer block and each B block is a controlled distribution copolymer block of at least one conjugated diene and at least one mono alkenyl arene;
   b. each A block having a number average molecular weight between about 3,000 and about 60,000 and each B block having a number average molecular weight between about 30,000 and about 300,000;
   c. each B block comprises terminal regions adjacent to the A blocks that are rich in conjugated diene units and one or more regions not adjacent to the A blocks that are rich in mono alkenyl arene units;
   d. the total amount of mono alkenyl arene in the block copolymer is about 20 percent weight to about 80 percent weight;
   e. the weight percent of mono alkenyl arene in each B block is between about 17 percent and about 50 percent; and
   f. wherein the styrene blockiness index of the block B is less than about 10 percent.

32. An article comprising 5 to 40 percent weight of at least one unhydrogenated block copolymer and 60 to 95 percent weight of a styrene-grafted polypropylene polymer, wherein said block copolymer has at least one block A and at least one block B and wherein:
   a. each A block is a mono alkenyl arene homopolymer block and each B block is a controlled distribution copolymer block of at least one conjugated diene and at least one mono alkenyl arene;
   b. each A block having a number average molecular weight between about 3,000 and about 60,000 and each B block having a number average molecular weight between about 30,000 and about 300,000;
   c. each B block comprises terminal regions adjacent to the A blocks that are rich in conjugated diene units and one or more regions not adjacent to the A blocks that are rich in mono alkenyl arene units;
   d. the total amount of mono alkenyl arene in the block copolymer is about 20 percent weight to about 80 percent weight;
   e. the weight percent of mono alkenyl arene in each B block is between about 10 percent and about 75 percent; and
wherein the styrene blockiness index of the block B is less than about 10 percent, wherein said block copolymer has the general configuration ABA, (A-B)$_n$, (A-B)$_n$A, (A-B)$_n$X or mixtures thereof where n is an integer from 2 to about 30, X is the coupling agent residue, each A block has a number average molecular weight of about 10,000 to about 30,000, each B block has a number average molecular weight of about 30,000 to about 150,000, and the total mono alkenyl arene amount in the block copolymer is between about 35 weight percent and about 80 weight percent.

33. A cap seal formed from a formulated composition having at least one unsaturated block copolymer and at least one engineering thermoplastic resin, wherein said block copolymer has at least one block A and at least one block B and wherein:
   a. each A block is a mono alkenyl arene homopolymer block and each B block is a controlled distribution copolymer block of at least one conjugated diene and at least one mono alkenyl arene;
   b. each A block having a number average molecular weight between about 3,000 and about 60,000 and each B block having a number average molecular weight between about 30,000 and about 300,000;
   c. each B block comprises terminal regions adjacent to the A blocks that are rich in conjugated diene units and one or more regions not adjacent to the A blocks that are rich in mono alkenyl arene units;
   d. the total amount of mono alkenyl arene in the block copolymer is about 20 percent weight to about 80 percent weight;
   e. the weight percent of mono alkenyl arene in each B block is between about 17 percent and about 50 percent; and
   f. wherein the styrene blockiness index of the block B is less than about 10 percent.

* * * * *